R. H. RICE & F. R. C. BOYD.
POWER TRANSMITTING MECHANISM.
APPLICATION FILED MAR. 9, 1906.

901,473.

Patented Oct. 20, 1908.
5 SHEETS—SHEET 4.

Witnesses:
Marcus L. Byng.
Helen Oxford

Inventors,
Richard H. Rice,
Frederic R. C. Boyd,
By Albert H. Davis
Att'y

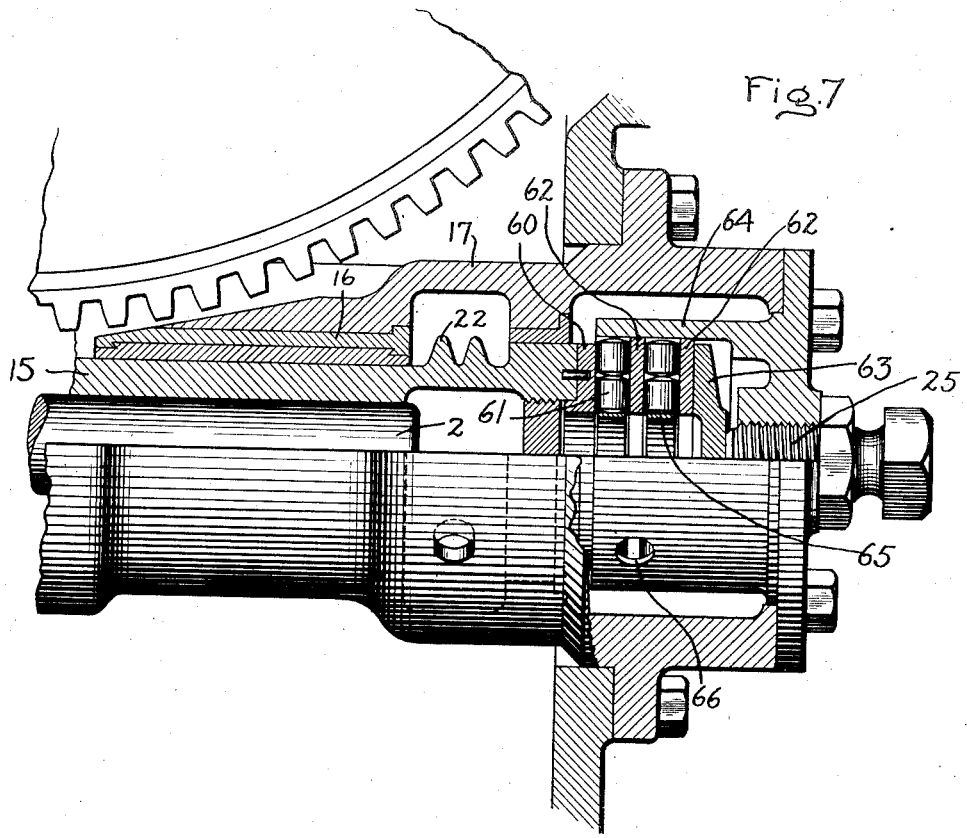

UNITED STATES PATENT OFFICE.

RICHARD H. RICE, OF SWAMPSCOTT, AND FREDERIC R. C. BOYD, OF LYNN, MASSACHUSETTS, ASSIGNORS TO GENERAL ELECTRIC COMPANY, A CORPORATION OF NEW YORK.

POWER-TRANSMITTING MECHANISM.

No. 901,473.  Specification of Letters Patent.  Patented Oct. 20, 1908.

Application filed March 9, 1906. Serial No. 305,075.

*To all whom it may concern:*

Be it known that we, RICHARD H. RICE and FREDERIC R. C. BOYD, citizens of the United States, residing, respectively, at Swampscott, county of Essex, State of Massachusetts, and at Lynn, county of Essex, State of Massachusetts, have invented certain new and useful Improvements in Power-Transmitting Mechanisms, of which the following is a specification.

The present invention relates to that class of mechanisms wherein a motor, such as an elastic fluid turbine, is employed to drive a load through speed-reducing gearing, and has for its object to improve their construction.

Figure 1:
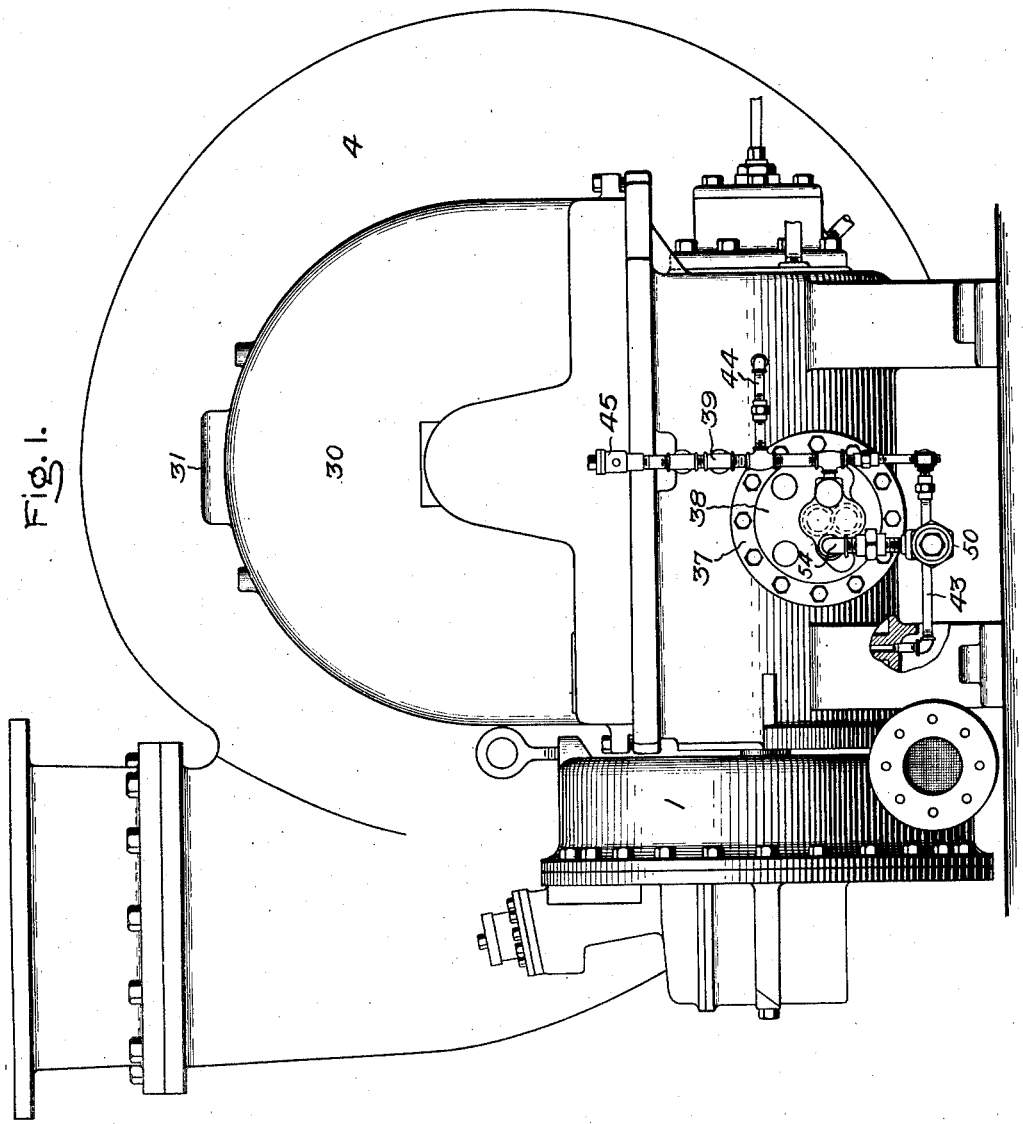
Figure 2:
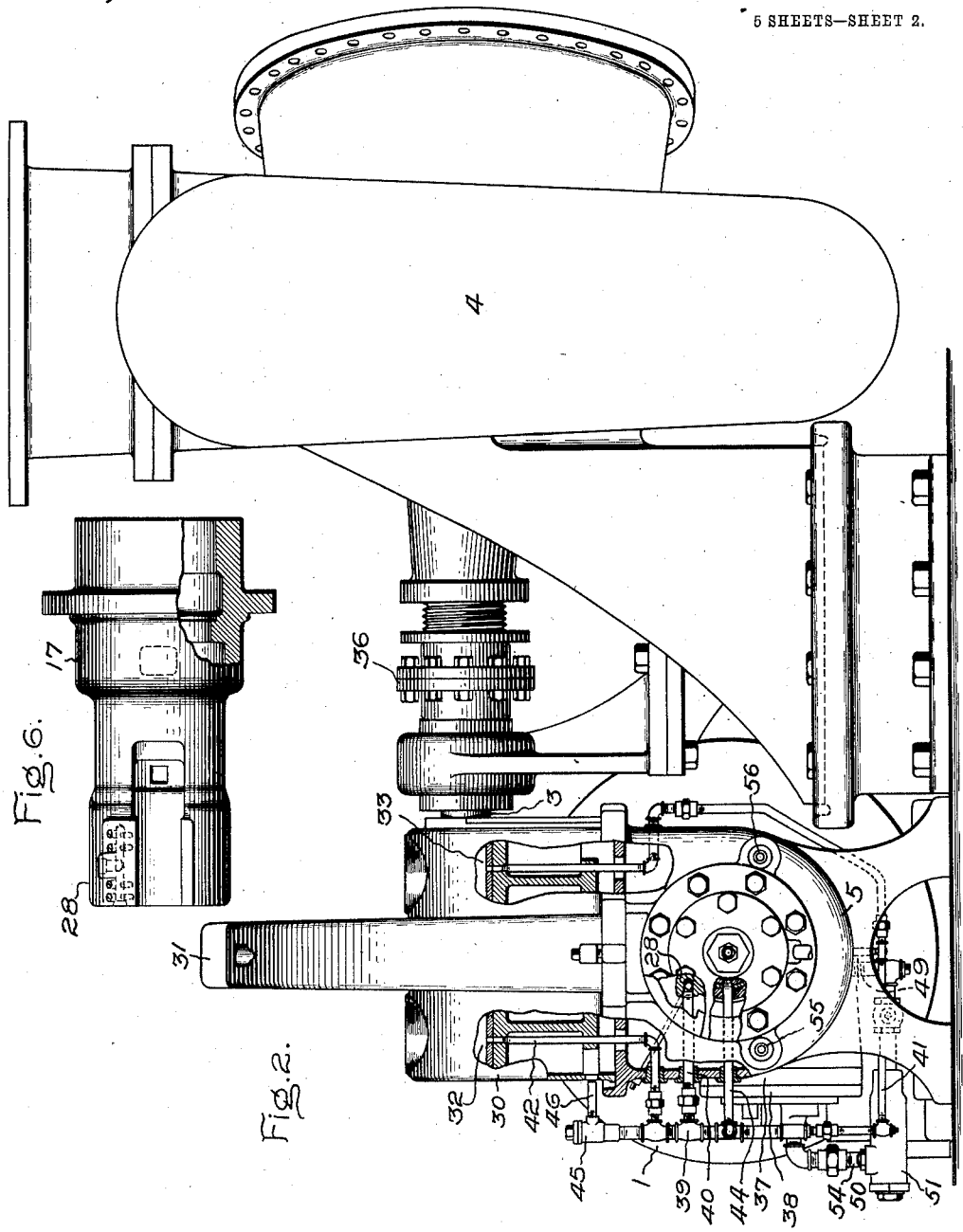
Figure 3:
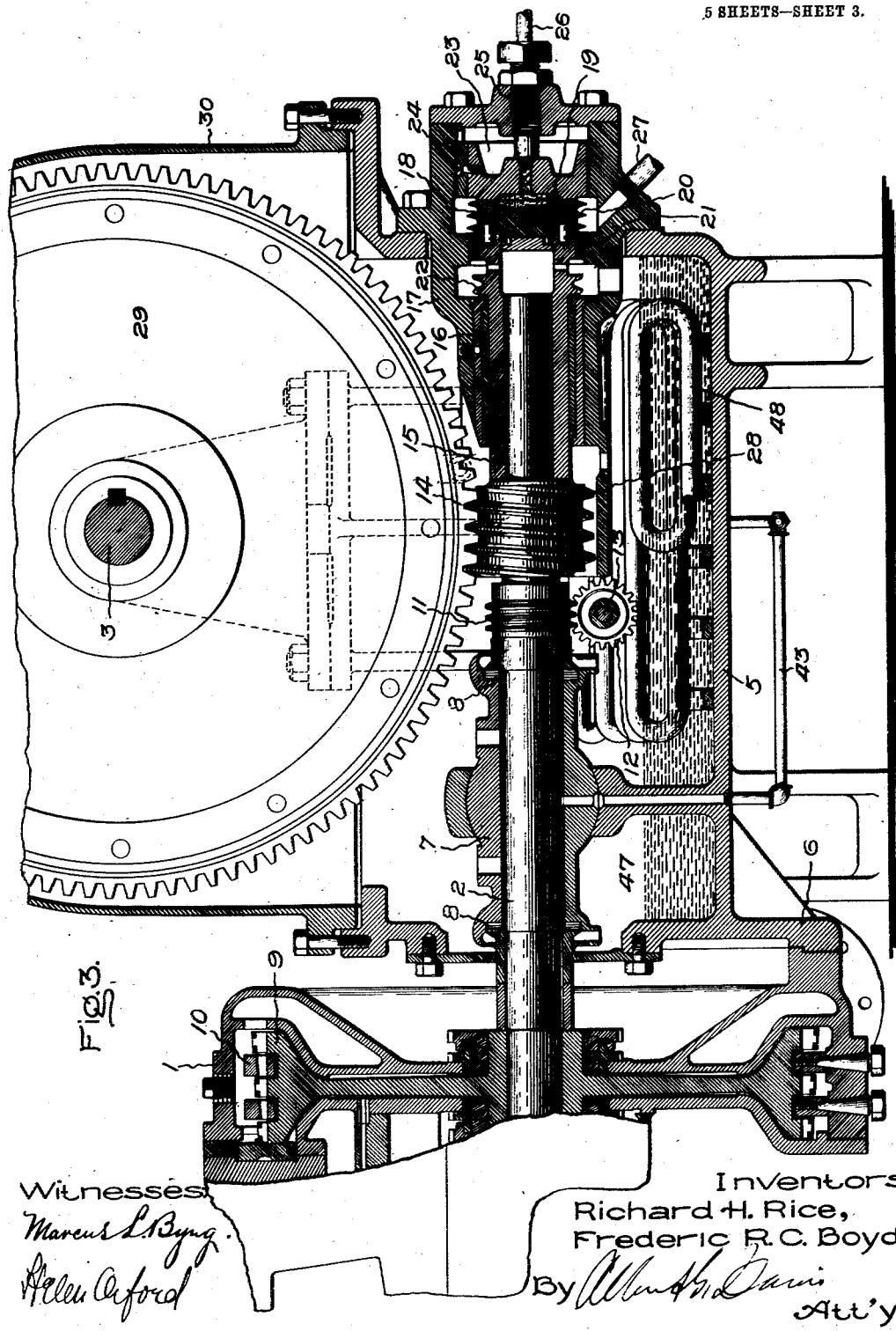
Figure 4:
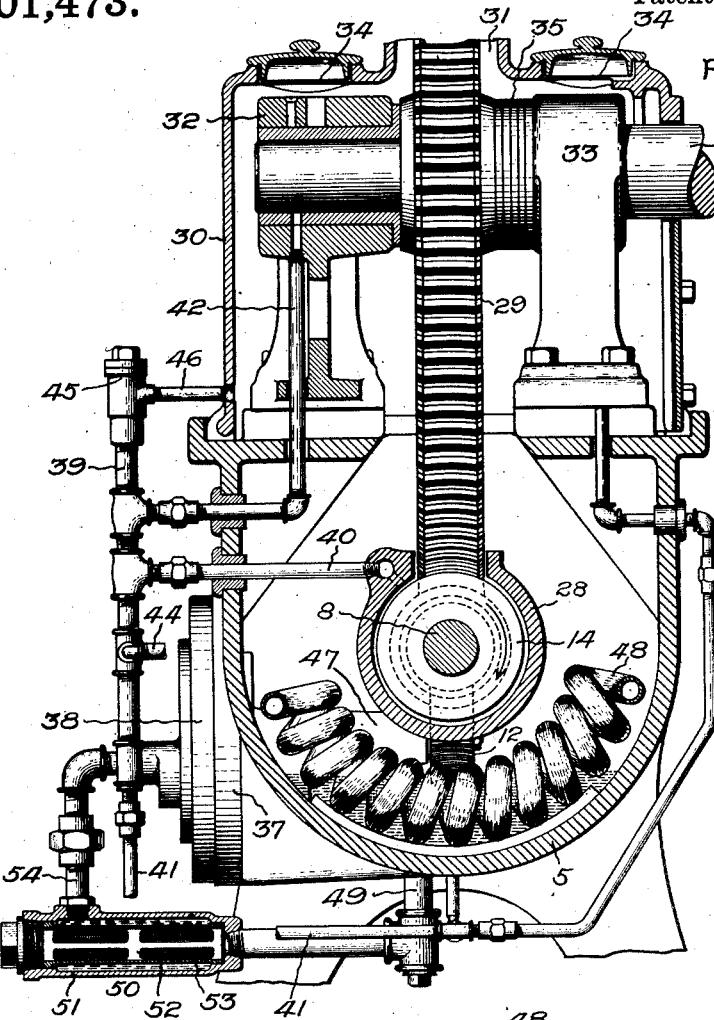
Figure 5:
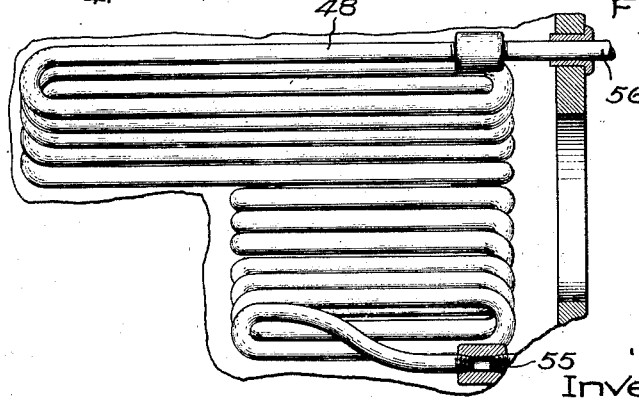

In the accompanying drawings, which illustrate one embodiment of our invention, Figure 1 is a front elevation of a turbine-driven centrifugal pump; Fig. 2 is a side elevation of the same; Fig. 3 is a longitudinal section through the turbine and power-transmitting gearing; Fig. 4 is a cross-section through the driving worm and inclosing casing; Fig. 5 is a detail view of the cooling coil for the lubricant; Fig. 6 is a detail sectional view of the sleeve employed to take up the thrust on the worm and also to adjust it with respect to the worm wheel driven thereby; and Fig. 7 is a detail view of a slight modification.

1 represents a motor designed to run at relatively high speed. In the present illustration it is shown as being a single-stage steam turbine of the Curtis type, but it could be a steam motor of any other construction, an electric, hydraulic, driving pulley, or other motor.

2 is the main shaft of the motor, Fig. 3, which is geared to the secondary or driven shaft 3 located at right angles thereto by suitable speed-reducing gearing, to be afterwards described. The secondary shaft is connected to a rotary hydraulic pump 4 directly or through a suitable coupling. Instead of driving a pump, any other suitable form of load may be substituted. The pump or other load device is provided with suitable supports whereby it can be mounted and alined with respect to the driving mechanism. The preferred arrangement is to provide a bed-plate or frame 5 that is common to the turbine and the driven parts, since it simplifies the construction and facilitates alinement. The shafts are provided with suitable bearings and with the gears are inclosed in suitable housings. The motor is bolted or otherwise secured to the frame which carries the bearings, etc. It is to be noted that the motor, the driving gears, etc., are so constructed and arranged that they form a self-contained unit which is capable of use with various forms of apparatus. Such being the case the apparatus can be utilized for a variety of purposes and connected to and disconnected from the driven apparatus at will. It can also be shipped as a unit without danger of the parts getting out of alinement.

The turbine is overhung on the end of the main shaft, and the casing thereof is bolted to a shouldered portion 6 on the frame. Between the casing and the housing around the gears and other parts is a considerable space to prevent heat being transmitted from the turbine to the interior of the housing. Adjacent to the turbine and supported by the frame is a self-alining journal 7. At each end of the journal and engaging with collars on the shaft are roller thrust bearings 8. These bearings serve to center the rows of buckets on the wheel 9 with respect to the rows of intermediate buckets 10 carried by the casing. It is important that this relation be preserved under all conditions to prevent injury to the buckets. At the right of the journal the shaft is provided with a small worm 11 of ordinary construction meshing with a worm wheel 12 carried by a small shaft 13 extending at right angles to the main shaft. The shaft 13 is employed to drive a lubricating pump of the gear type, as will appear later.

Splined on the main shaft so that it can be adjusted longitudinally thereof is a Hindley worm 14. We prefer to use a Hindley worm on account of the increased bearing surface between it and the teeth of the worm wheel, but under certain conditions a straight worm can be employed. Owing to the fact that the Hindley worm is somewhat larger at the ends than in the center it must be accurately and independently adjusted on the shaft to aline it with the driven gear, and since the bucket wheel must also be accurately adjusted with respect to the intermediates, special means are provided for the purpose. The diameter of the main shaft is somewhat reduced on the right-hand end to receive the Hindley worm 14. On the right of the worm is a sleeve 15 by means of which it can be adjusted longitudinally. The sleeve also forms a part of the end-thrust device. It is preferable to make the worm and sleeve of separate pieces, but if desired they may be formed in a single piece. The worm and sleeve are both splined on the main shaft so as to turn therewith, at the same time permitting of longitudinal adjustment. The periphery of the sleeve is finished, and surrounding it is a bearing 16 carried by the tubular shell 17, the latter being detachably secured to the frame 5 by bolts. On the end of the sleeve is a thrust block 18 which may be formed integral therewith or separate as desired. It is better to make it separate since it can be more readily removed in case of injury. The block is provided with a central chamber 19 to receive fluid under pressure, such as water or oil, and the periphery has one or more sharpened projections 20 that act as a means to prevent the fluid discharged from the chamber 19 from passing through the partition 21 into the chamber beyond. The sleeve is also provided with one or more annular projections 22 located in a second collection chamber which tend to prevent oil from the journal from entering the water-collecting chamber surrounding the thrust blocks. Any lubricant that works between the shaft and sleeve 15 will discharge into the chamber at the end of the shaft and be discharged through the radial openings in the sleeve.

Situated in line with the thrust block and containing a chamber registering with the chamber 19 is an adjustable block or abutment 23. The abutment is prevented from turning by the spline or feather 24, and is adjusted longitudinally by the adjusting screw 25. The said screw is bored centrally to receive the pipe 26, the latter discharging fluid under pressure to the chamber 19. We prefer to employ water for this purpose, and the structure shown is designed to take it from the city mains. Any other suitable source of pressure can, however, be employed if desired. The water flows between the blocks in the form of a thin film and is collected in the surrounding chamber and discharged by the pipe 27. With this arrangement water is continuously flowing which, in addition to lubricating the parts, serves to absorb the heat generated at this point, and also to reduce the temperature of the shell and other parts.

The shell carrying the right-hand journal and thrust bearing is provided with a curved projection or casing 28 which closely surrounds the driving worm, as shown in Figs. 4 and 6 to keep a body of lubricant in contact therewith. The inner wall of the part 28 is in close proximity to the worm, and as the latter rotates it coöperates with said wall to distribute the lubricant over the teeth and keep their temperature well within the safe working limits, it being understood that the thrust at this point is large resulting in the generation of a good deal of heat which must be quickly and effectively dissipated to obtain satisfactory results. The projection is provided with a passage through which lubricant is supplied to the worm and worm gear under pressure. The object of this arrangement is to absorb the heat generated by the friction between the teeth of the worm and worm gear. The direction of flow of the lubricant is such that the rotation of the worm carries it against the teeth of the worm gear. Since there is a large amount of heat to be dissipated at this point, it is important that the supply of lubricant be abundant and also that it be constantly maintained. This is true whether a Hindley or a straight worm or a pair of spiral gears is employed. Situated above the worm and meshing therewith is a worm gear 29, the latter being mounted on the driven shaft 3. Surrounding the worm gear and bolted to the frame is a housing 30, the upper end of which is provided with an opening 31 to permit the heated air within the housing and frame to escape. The driven shaft 3 is supported by suitable journals 32 and 33 (Fig. 4) which are inclosed by the housing and are bolted to the upper part of the frame. The portions of the housing directly over the journals are provided with covered openings 34 through which the journals can be lubricated. Between one of the journals and the worm gear is a roller thrust bearing 35 which takes up the thrust on the gear due to the action of the worm. If desired this thrust bearing can be duplicated on the opposite side of the gear. On the end of the driven shaft is a coupling 36 for connecting the former to the centrifugal pump or other load. If desired, this coupling can be omitted.

The lubricating system for the gearing will now be described. On the outside of the frame and preferably, but not necessarily, formed integral therewith, is a pump casing 37 containing an ordinary gear pump of suitable construction. Instead of using a gear pump, any other suitable type of pump may be substituted. We prefer however to use a gear pump on account of its simplicity. The pump casing is provided with a removable cover 38 containing the necessary ports. The pump is driven by the main shaft 2 through the small worm 11, worm wheel 12 and shaft 13, Fig. 3, as previously described. The pump discharges into the pressure pipe 39 located at one side of the frame, and from this is a pipe 40, Figs. 2 and 4, leading to the projection 28 which incloses the main driving worm. A second pipe 41 extends under the driving shaft and frame to the right-hand journal 33, and a third pipe 42 to the left-hand journal 32. The left-hand main-shaft journal (Fig. 3) is supplied by the pipe 43, and the right-hand journal by the pipe 44, Fig. 2. The upper end of the pressure pipe or header 39 is provided with a relief valve 45, and when this valve opens lubricant is discharged through the pipe 46 into the housing 30 from which it flows into the chamber in the frame. The lubricant discharged from the bearings and the worm is collected in a drainage chamber 47 formed in the frame or base 5.

Since there is a comparatively large amount of heat to be dissipated due to the action of the gears a water circulation is provided for reducing the temperature of the lubricating oil. In the bottom of the chamber 47 in the frame and below the main worm is a coil of pipe 48 of the form shown in Fig. 5. The turns of the coil are bent back and forth to furnish the necessary amount of surface. In order to leave sufficient room for certain of the pump parts, some of the turns are made longer than others. The coil is so bent after forming that it follows the curved contour of the bottom of the chamber in the frame and is supported at a distance from the wall by thin curved strips to insure good circulation and facilitate cooling. To the lower end of the chamber 47 is connected a pipe 49 which in turn is connected to a strainer 50. The strainer comprises an outer shell 51 and a frame 52 that supports the screen 53. The strainer is provided with a removable head or plug which serves to hold the frame in place. Between the screen and the shell is a space through which the oil passes in entering the pipe 54, the latter being connected to the suction side of the pump. It will thus be seen that the lubricating oil is used over and over again, and that it is cooled while in the collection chamber 47 and also strained before reëntering the pump.

In Figs. 2 and 5 are shown the inlet and exhaust pipes 55 and 56 for conveying cooling water to and from the cooling coil 48.

Although a worm and wheel reduction is shown between the driving and the driven elements, it is within the scope of our invention to use spiral gears; the latter may be considered as a multi-threaded worm and wheel of very coarse pitch. It is also within the scope of our invention to locate the driving and the driven shafts parallel and use spiral or herring-bone gears. We may also locate the driving and driven shafts at any desired angle with respect to each other. Where the end thrust on the driving shaft is not excessive we may use a plain multiple roller bearing, such as is shown in Fig. 7, in place of the water-lubricated thrust bearing shown in Fig. 3.

Referring to Fig. 7, 17 represents the shell which contains the bearing for supporting the shaft 2 and the thrust bearing. Located inside of the bore of the shell and inclosing the shaft is a sleeve 15 for adjusting or fixing the position of the worm or the shaft or both. On the end of the sleeve is a hardened ring 60 held by dowel pins. Coöperating with the ring are rollers 61 and between the sets of rollers and at the end are rings 62, the planes of which are transverse to the shaft axis. The end ring is engaged by the screw 25, the latter being mounted in the head of the shell. The head of the shell is provided with a cylindrical extension 64 which supports the rings and holds the rollers against outward movement. The rollers are held against inward movement by suitable means such as the flat rings 65. The extension 64 is provided with one or more holes 66 to permit lubricant in the surrounding chamber in the shell to enter and lubricate the rollers. When a straight worm is used instead of the Hindley, it may be mounted solidly on the shaft, and the longitudinal adjustment taken care of by the adjustable thrust bearing shown.

When the turbine is mounted on a separate support instead of being attached to the frame supporting the shaft 2, we can mount the worm, which may be straight or of the Hindley type, solidly on the shaft. In this case it would be preferable to insert a flexible coupling between the turbine and the shaft 2.

In accordance with the provisions of the patent statutes, we have described the principle of operation of our invention, together with the apparatus which we now consider to represent the best embodiment thereof; but we desire it to be understood that the apparatus shown is only illustrative, and that the invention can be carried out by other means.

What we claim as new and desire to secure by Letters Patent of the United States, is,—

1. In an apparatus of the character described, the combination of a motor, a shaft driven thereby, a secondary or driven shaft, gearing between the shafts, a bearing for receiving the thrust of the gearing on the motor-driven shaft comprising means for adjusting the gear upon said shaft, and a conduit for introducing fluid under pressure to the thrust bearing and continuously maintaining a fluid film between its blocks.

2. In an apparatus of the character described, the combination of a motor, a shaft driven thereby, a secondary or driven shaft, gearing between the shafts, a means for adjusting the gear on the motor-driven shaft, a thrust bearing for the motor-driven shaft, a conduit for introducing lubricant under pressure to the thrust bearing and continuously maintaining a fluid film between its blocks, one or more conduits for introducing lubricant to the gearing, and means for preventing the lubricant delivered to the gearing and the thrust bearings from mingling.

3. In an apparatus of the character described, the combination of a frame or support, a driving shaft, a driven shaft, a gear splined on the driving shaft, a gear on the driven shaft meshing therewith, a sleeve for longitudinally adjusting the gear on the driving shaft, a bearing block carried by the sleeve, an adjustable block carried by the frame or support, and a conduit for introducing fluid under pressure between the blocks and maintaining a fluid film therebetween.

4. In an apparatus of the character described, the combination of a frame or support, a driving shaft mounted thereon, a driven shaft, a gearing for transmitting motion from the driving to the driven shaft, a casing inclosing one of the gears to keep a body of lubricant in contact therewith for lubricating and cooling purposes, there being an opening in the top of the casing through which the other gear projects to mesh with the first gear, a conduit for supplying lubricant to the casing, and means for forcing lubricant through the conduit and casing.

5. In an apparatus of the character described, the combination of a frame or support, a driving shaft, a worm and worm wheel for transmitting motion from the driving to the driven shaft, a shell mounted on the frame which surrounds the shaft and supports one end thereof, a casing or projection carried by the shell which incloses the worm to keep lubricant in contact therewith for lubricating and cooling purposes, there being an opening in the casing for the worm gear to pass through into engagement with the worm, and a conduit for supplying lubricant to the casing or projection.

6. In an apparatus of the character described, the combination of a frame or support, a driving shaft mounted thereon, a driven shaft, a worm and worm wheel for transmitting motion from the driving to the driven shaft, a shell which surrounds the shaft, a casing or projection carried by the shell which incloses the worm to keep lubricant in contact therewith for lubricating and cooling purposes, a conduit for supplying lubricant to the casing or projection, a bearing for the shaft supported by the shell, and means for adjusting the worm longitudinally of the shaft and shell.

7. In a device of the character described, the combination of a motor having a rotating element, a shaft driven thereby, a bearing for the shaft, means for preventing longitudinal thrust on the shaft from being transmitted to the said rotating element, a driven shaft at right angles to the driving shaft, a longitudinally movable worm on the motor-driven shaft, a worm wheel secured to the driven shaft, a sleeve on the shaft, a thrust block carried by the sleeve, and an adjustable thrust block engaging with the first whereby the worm may be adjusted on its shaft.

8. In a device of the character described, the combination of a driving shaft, a driven shaft, worm gearing between the shafts, a means for adjusting the position of the worm and worm wheel with respect to each other, a means for discharging lubricant over the face of the worm, a base for supporting the shafts which contains a chamber to receive the lubricant after it is used, and a cooling coil located in the chamber.

9. In an apparatus of the character described, the combination of a driving and a driven shaft, gearing between the shafts, a shell for supporting the driving shaft and containing a cylinder and a collection chamber, a longitudinally adjustable bearing block in the cylinder, a second block opposing the first, the lubricant from the blocks discharging into the collection chamber, a bearing carried by the shell, and a second chamber formed in the shell and separated from the first to receive lubricant exhausting from the bearing.

10. In an apparatus of the character described, the combination of a base or frame, a driving shaft carried thereby, a driven shaft at right angles to the first, bearings for the driven shaft also carried by the frame and located above the driving shaft, gearing between the shafts, a fluid-pressure thrust bearing between the driving shaft and a fixed abutment, and a second thrust bearing between the driven shaft and a fixed abutment.

11. In an apparatus of the character described, the combination of a driving and a driven shaft, journals for the shafts, gearing between the shafts, a worm on one of the shafts, a worm wheel driven thereby, a pump driven by the worm gearing, conduits for conveying lubricant from the pump to the gearing to lubricate it and dissipate heat, and also to the journals, means for returning the lubricant to the source of supply for the pump, and a device for cooling the returning lubricant.

12. In an apparatus of the character described, the combination of a motor, a shaft driven thereby, a bearing arranged to take the thrust thereof, other bearings for supporting the motor-driven shaft, a frame for supporting the bearings, a second suitably supported shaft, gearing for transmitting motion from one shaft to the other, and means for supplying lubricant under pressure to the bearings and the gearing.

13. In an apparatus of the character described, the combination of a motor, a shaft driven thereby, a worm slidably mounted on the shaft and driven thereby, a frame, a bearing supporting one end of the shaft, a bearing for the other end of the shaft, a shell supporting said bearing and attached to the frame, a thrust-bearing carried by the shell which receives the thrust of the worm, a second suitably supported shaft, and gearing for transmitting motion from the worm to the second shaft.

In witness whereof, we have hereunto set our hands this sixth day of March, 1906.

RICHARD H. RICE.
FREDERIC R. C. BOYD.

Witnesses:
JOHN A. McMANUS, Jr.,
HENRY O. WESTENDARP.